(12) United States Patent
Carmel et al.

(10) Patent No.: US 7,826,810 B2
(45) Date of Patent: Nov. 2, 2010

(54) MULTIBAND RADIO WITH TRANSMITTER OUTPUT POWER OPTIMIZATION

(75) Inventors: Travis D. Carmel, Bloomfield, NY (US); Kenneth P. Beghini, Spencerport, NY (US)

(73) Assignee: Harris Corporation, Melbourne, FL (US)

( * ) Notice: Subject to any disclaimer, the term of this patent is extended or adjusted under 35 U.S.C. 154(b) by 799 days.

(21) Appl. No.: 11/429,837

(22) Filed: May 8, 2006

(65) Prior Publication Data

US 2007/0259628 A1  Nov. 8, 2007

(51) Int. Cl.
*H04B 1/04* (2006.01)

(52) U.S. Cl. .................. 455/127.2; 455/73; 455/77; 455/126; 455/103; 455/115.3; 330/2; 370/342; 370/311

(58) Field of Classification Search ... 455/127.1–127.5, 455/91, 103; 330/295, 298, 277
See application file for complete search history.

(56) References Cited

U.S. PATENT DOCUMENTS

| | | | | |
|---|---|---|---|---|
| 5,854,784 A * | 12/1998 | Solve et al. | ............... | 370/311 |
| 5,884,149 A * | 3/1999 | Jaakola | ................... | 455/103 |
| 6,023,612 A | 2/2000 | Harris et al. | | |
| 6,028,551 A * | 2/2000 | Schoen et al. | .......... | 342/357.16 |
| 6,064,857 A * | 5/2000 | Wiedeman et al. | ....... | 455/127.4 |
| 6,430,402 B1 * | 8/2002 | Agahi-Kesheh | .......... | 455/115.3 |
| 6,434,395 B1 * | 8/2002 | Lubin et al. | ................. | 455/466 |
| 6,563,880 B1 * | 5/2003 | Hunsinger et al. | .......... | 375/260 |
| 6,728,520 B2 * | 4/2004 | Coan et al. | ................... | 455/126 |
| 6,782,244 B2 * | 8/2004 | Steel et al. | ............... | 455/127.1 |
| 7,222,369 B2 * | 5/2007 | Vering et al. | ................... | 726/28 |
| 7,423,477 B2 * | 9/2008 | Sorrells et al. | ................. | 330/2 |
| 7,493,094 B2 * | 2/2009 | Ichitsubo et al. | ......... | 455/127.1 |
| 2002/0183013 A1 * | 12/2002 | Auckland et al. | ............. | 455/73 |
| 2003/0193923 A1 * | 10/2003 | Abdelgany et al. | .......... | 370/342 |
| 2006/0030277 A1 * | 2/2006 | Cyr et al. | ..................... | 455/77 |
| 2006/0141960 A1 * | 6/2006 | Fernandez et al. | ....... | 455/127.1 |

* cited by examiner

*Primary Examiner*—Edward Urban
*Assistant Examiner*—Ganiyu Hanidu
(74) *Attorney, Agent, or Firm*—Fox Rothschild, LLP; Robert J. Sacco

(57) ABSTRACT

Transmitter (116) designed to automatically reconfigure one or more circuit parameters associated with an RF power amplifier (210) in response to certain user input commands. Specifically, a transmitter circuit configuration is automatically modified under certain conditions to produce a higher RF output power. The higher RF power output is possible because the transmitter configuration is adjusted specifically for use under a particular set of operating conditions. The operating conditions that trigger the higher powered configuration include burst transmission mode.

25 Claims, 3 Drawing Sheets

MULTIBAND RADIO WITH TRANSMITTER OUTPUT POWER OPTIMIZATION

BACKGROUND OF THE INVENTION

1. Statement of the Technical Field

The inventive arrangements relate to portable radios, and more particularly to maximizing transmitter power output of portable handheld radio equipment.

2. Description of the Related Art

Improvements in technology have led to the development of a new generation of multi-band portable radios. These portable radios include multi-mission tactical radios that are designed to be compatible with the Joint Tactical Radio System (JTRS). The JTRS system is built upon the well known Software Communications Architecture (SCA) which establishes a system by which programmable radios can be quickly modified with software to implement any one of a wide variety of communication link protocols on a variety of frequency bands. These highly flexible radios are capable of operating over a very wide range of frequencies, for communicating voice and data using any one of a variety of modulation schemes.

Notwithstanding the highly flexible software defined nature of these radios, there remain certain aspects of the equipment that must be implemented in hardware. This hardware typically includes the transmitter RF power amplifier circuitry. The hardware nature of this circuitry has typically resulted in certain compromises. For example, since the nature of the transmitted signals is programmable, the transmitter power amplifier circuitry must be designed to accommodate any communications protocol, regardless of frequency, waveform, modulation, data rate, and duty cycle. While this approach ensures flexibility, it is necessarily a compromise design.

For example, the transmitter output power can be limited to protect the final RF power amplifier under worst case conditions. This is typically implemented at design time by fixing various circuit parameters, such as the voltage applied to the power amplifier, transistor bias current settings, and maximum power output. While necessary to protect the RF power amplifier, these fixed design parameters can limit the maximum transmitter performance achievable under certain circumstances. For example, an RF power amplifier can be designed for a maximum 5 watt output power. This design can protect the power amplifier from damage caused by overheating. Under certain limited circumstances it may be possible to safely increase power amplifier RF power output levels. However, because the RF power amplifier design must be compatible with any communication protocol, the more conservative circuit design must be implemented.

SUMMARY OF THE INVENTION

The invention concerns a radio transmitter system. The radio transmitter includes an RF power amplifier comprising one or more RF power transistors. A control processor is provided that generates one or more control signals responsive to a user input. The transmitter also includes one or more circuits that are designed to selectively vary one or more operating characteristic of the RF power amplifier responsive to the one or more control signals. More particularly, the control processor is programmed to automatically generate a control signal in response to one or more user command that directly or indirectly causes the transmitter to be excited by signals having a predetermined data transmission rate, a predetermined duty cycle, a predetermined modulation type, or a predetermined frequency band.

According to one aspect of the invention, the control signal is a bias control signal. In that case, the transmitter system includes a bias control circuit designed to control a bias setting for the one or more RF power transistor. The bias control circuit is responsive to the bias control signal for varying the bias setting. According to another aspect, the control signal includes a voltage control signal. In that case, the transmitter system also includes a variable power supply circuit having a variable DC voltage output coupled to one or more RF power transistors. For example, if the RF power transistor is a field effect transistor the DC voltage output would be directly or indirectly coupled to a drain of the RF power transistor. The variable power supply circuit is designed to be responsive to the voltage control signal to vary the DC voltage supplied to the RF power transistor.

According to another aspect, the control signals include an RF power output control signal. In that case, the radio transmitter system advantageously includes an RF power output control circuit including a feedback loop. The RF power output control circuit is responsive to the RF power output control signal so as to selectively vary an RF power output of the RF power amplifier.

From the foregoing, it will be understood that the one or more operating characteristics of the RF power amplifier that can be varied can include a bias setting for the RF power transistors, a DC power supply voltage applied to the one or more RF power transistor, and/or an RF power output control loop for the RF power amplifier. In this regard, the invention can also include one or more data stores that contain data that specify certain parameters designed to control the foregoing operating characteristics. Notably, these parameters define at least a first transmitter configuration and a second transmitter configuration. For example, the first transmitter configuration can define a set of operating characteristic for the RF power amplifier that results in a higher maximum RF power output for the RF power amplifier as compared to the second transmitter configuration.

According to one embodiment, the control processor is advantageously programmed to automatically configure the transmitter in the first transmitter configuration when the user input command directly or indirectly indicates that the transmitter will be transmitting bursts of data. According to another aspect, the control processor is programmed to automatically configure the transmitter in the first transmitter configuration when the user input command directly or indirectly indicates that the transmitter will be transmitting on an operating band including a frequency selected for communicating with an earth orbiting satellite.

The invention also includes a method for operating a radio transmitter system. The method includes generating a control signal in response to a user input command. Such control signals are generated when the user input directly or indirectly causes the radio transmitter system to be excited by certain signals. For example, such signals can be defined as having one or more of a predetermined data transmission rate, a predetermined duty cycle, a predetermined modulation type, and/or a predetermined frequency band. The control signals are used to selectively vary one or more operating characteristics of a power amplifier circuit of the transmitter system.

According to one embodiment, the operating characteristic includes one or more of the following: a bias setting for one or more RF power transistor of the radio transmitter system, a DC power supply voltage coupled to one or more RF power transistor of the radio transmitter system, and an RF power output of the radio transmitter system.

According to another aspect of the invention, the method also includes storing two or more parameters in at least one data store. These parameters are selected for controlling the bias settings RF power transistors, the DC power supply voltage applied to the one or more RF power transistors, and/or the RF power output of the radio transmitter system. These parameters therefore define at least a first transmitter configuration and a second transmitter configuration.

The method also includes selecting the first transmitter configuration to include a set of operating characteristic for the RF power amplifier that results in a higher maximum RF power output for the RF power amplifier as compared to the second transmitter configuration. For example, the method includes automatically configuring the transmitter in the first transmitter configuration when the user input command directly or indirectly indicates that the transmitter will be transmitting bursts of data. The first transmitter configuration can also be implemented in response to a user input command that directly or indirectly indicates that the radio transmitter system will be transmitting on an operating band including a frequency selected for communicating with an earth orbiting satellite.

DETAILED DESCRIPTION OF THE PREFERRED EMBODIMENTS

The invention concerns a radio system which includes a transmitter. The transmitter is designed to automatically reconfigure one or more circuit parameters associated with an RF power amplifier in response to certain user input commands. Specifically, a transmitter circuit configuration is automatically modified under certain conditions to produce a higher RF output power. The higher RF power output is possible because the transmitter configuration is adjusted specifically for use under a particular set of operating conditions. For example, the operating conditions can include a data rate, duty cycle, a modulation type, and/or a frequency band.

The invention can be used with a conventional radio system. However, the invention is particularly advantageous for use in connection with a software defined radio (SDR) system, which systems are well known in the art. For convenience, the invention will be described in connection with an SDR system. Still, it should be understood that it is not limited in this regard.

Figure 1:
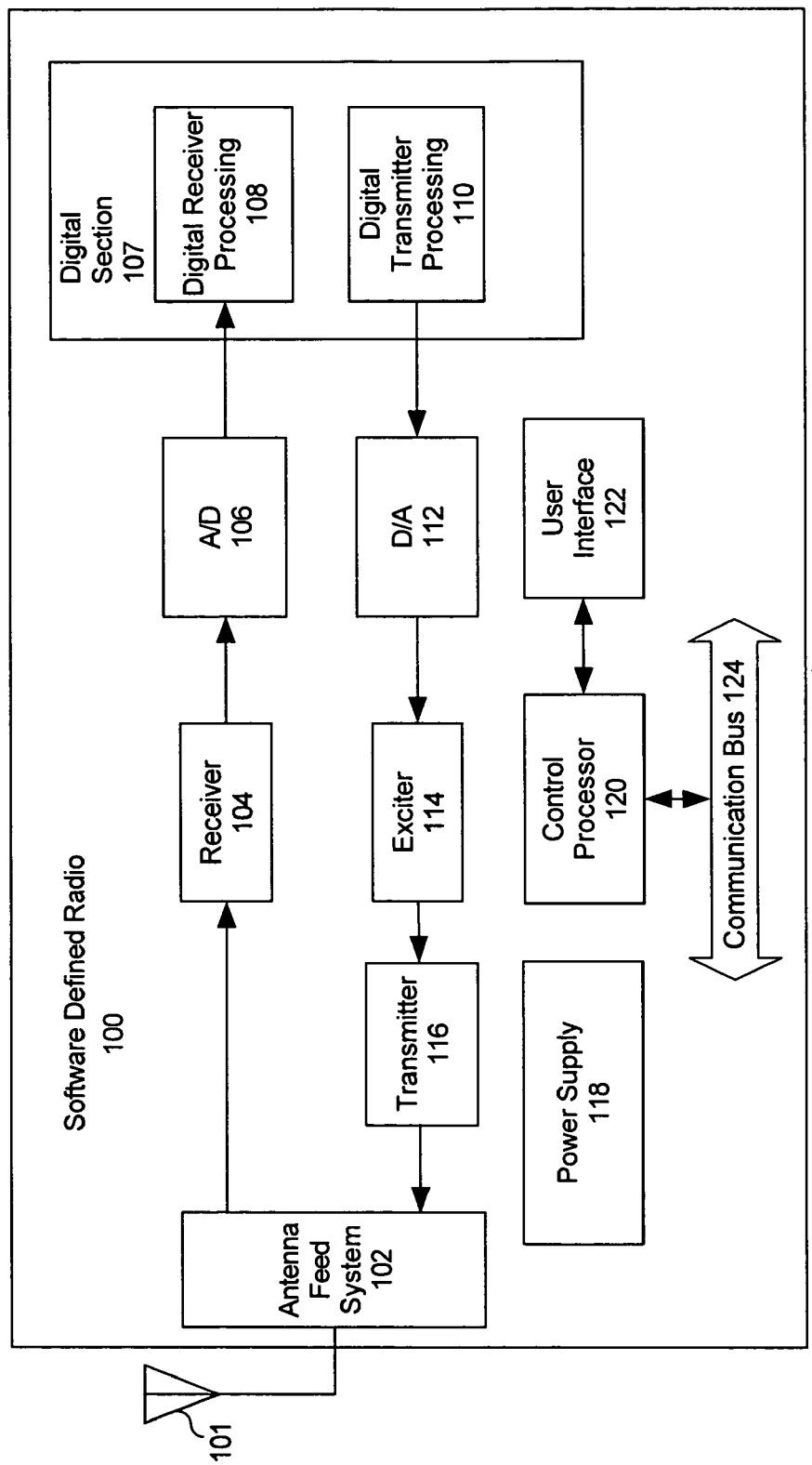
FIG. 1 is a block diagram of a software defined radio that is useful for understanding the invention.

FIG. 1 is a block diagram of a SDR that is useful for understanding the invention. Software defined radio 100 can include an antenna 101 that is coupled to an antenna feed system 102 for routing received and transmit signals. The antenna feed system 102 can include a transmit/receive switch for selectively connecting the antenna to the receiver 104 or the antenna 116. The transmit/receive switch can connect the receiver 104 to the antenna 101 when SDR 100 is in a receive state. The receive/transmit switch can connect the transmitter 116 to the antenna 101 when the SDR is in a transmit state. The antenna feed system 102 can be controlled by the control processor 120.

In accordance with conventional SDR design, signals from the antenna feed system are communicated to the receiver 104. Receiver 104 can include any one of a wide variety of broadband receiver systems as are commonly known in the field of software defined radios. The receiver can include one or more stages of RF amplifiers and filters. Depending on the design of the SDR system, the receiver 104 can also include one or more mixing stages, IF amplifiers and IF filter stages. One or more RF or IF output channels are communicated from the receiver 104 to one or more analog to digital (A/D) converters in A/D block 106. Once the incoming analog signal has been converted to a digital signal in A/D block 106, it is passed to the digital section 107 for any necessary digital signal processing. Receiver digital signal processing is performed in digital receiver processing unit 108.

On the transmit side, data or voice communications are processed digitally in digital transmitter processing section 110. Ultimately, the digital transmitter processing block 110 passes one or more channels of these digital signals to D/A converter block 112, where they are converted to analog IF or RF signals. These signals are typically communicated to an exciter block 114 which increases the RF power to a level sufficient for driving an RF power amplifier designed to produce even higher levels of RF output power. In some instances, the exciter block 114 can be included as part of the transmitter section 116. In either case, the transmitter output is coupled to the antenna feed system 102 and thereafter to the antenna 101.

Referring again to FIG. 1, the SDR 100 can include a power supply 118 for providing power to the various digital and analog blocks that comprise the system. The SDR can also include a control processor 120. Control processor 120 can be comprised of a programmable microprocessor, general purpose computer programmed with a set of instructions or any other electronic circuitry suitable for performing the functions as described herein. According to one embodiment, the control processor is a microprocessor programmed with a suitable set of instructions for performing the various functions described herein.

Control processor 120 includes data communications ports for communicating control signals to one or more component systems forming the SDR 100. The communications ports can be coupled to any suitable type of conventional computer data communication bus 124. The computer data communication bus 124 can be used to communicate control signals from the control processor 120 to one or more of the SDR subsystems as hereinafter described.

The control processor is also operatively coupled to a user interface 122. User interface 122 can be implemented using a display (not shown) for presenting a graphical user interface (GUI). The display can be a liquid crystal display (LCD) or any other display suitable for use on a mobile station. The display can be black and white or color. The user interface 122 also advantageously includes a user input device. The user input device can include a keypad, a touch pad, buttons, switches, sensors, and/or any other devices which can be used to receive user inputs.

Figure 2:
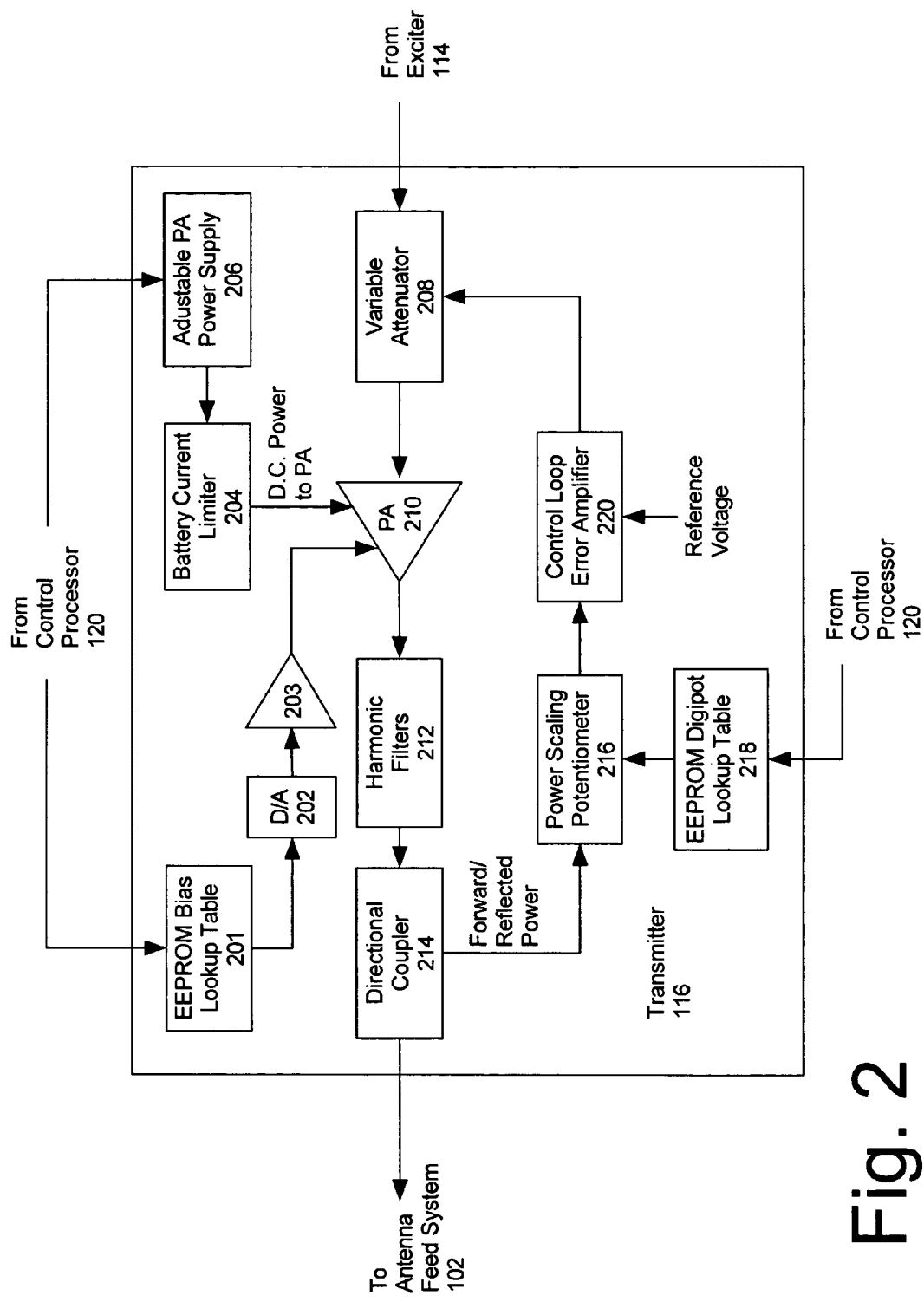
FIG. 2 is a block diagram of a transmitter section of the software defined radio in FIG. 1.

FIG. 2 is a more detailed block diagram of the transmitter section 116 previously described in connection with SDR 100. Within transmitter 116, RF signals from the exciter 114 are communicated to a variable attenuator 208. The variable attenuator 208 is part of an RF power output control loop which will be discussed in further detail below. In general, however, the variable attenuator 208 is used to scale an input RF drive signal before it is communicated to an RF power amplifier (PA) system such as PA 210. A power amplifier is a circuit for converting DC input power into a significant amount of RF/microwave output power. A wide variety of power amplifier circuit designs are well known in the art. In FIG. 2, a single PA 210 is shown. However, it will be appreciated by those skilled in the art that transmitter 116 can advantageously include one or more such power amplifiers. The exact arrangement of PA 210 can vary somewhat within the scope of the present invention. However, PA 210 is typically a cascaded design that includes one or more RF power transistors that are cascaded to increase the power level of a low level RF signal to a desired level. For example, and without limitation, the RF power transistors can be linear MOSFET or advanced GaAs FET devices which provide high gain and wide dynamic range. PA 210 can also include one or more RF combining circuits, and/or RF microstrip networks which may be used to combine the RF output power from two or more such RF power transistors. PA 210 will be discussed in more detail below.

Transmitter 116 also includes one or more harmonic filters 212 that are useful for removing harmonic energy generated by PA 210. The exact bandwidth and rejection characteristics of the harmonic filters 212 will depend upon a particular transmitter application. However, harmonic filters are well known in the art and therefore will not be discussed here in detail.

Transmitter 116 also includes a directional coupler 214. RF power output from the PA 210 is communicated to the directional coupler. For example, the directional coupler 214 can be coupled to the output of the harmonic filters 212. Most of the RF energy communicated to the directional coupler 214 is passed to the output of the directional coupler to the antenna feed system 102. However, the directional coupler 214 also communicates a small amount of the forward and reflected RF power to a power scaling device. According to an embodiment of the invention, the power scaling device is provided in the form of a power scaling potentiometer 216. Power scaling potentiometer 216 is advantageously selected to be a digital potentiometer. Digital potentiometers are well known in the art and are generally used to emulate the operation of a mechanical potentiometer. Such devices are conventionally controlled through a simple interface. In FIG. 2, a simple control interface is provided between the power scaling potentiometer 216 and the EEPROM digipot look-up table 218 to control the scaling function provided by the power scaling potentiometer 216. The control signal output of the EEPROM digipot look-up table is advantageously controlled remotely from the control processor 120.

An RF detector circuit (not shown) is provided for converting the coupled portion of the forward/reflected power from directional coupler 214 to a base band or DC control signal. The magnitude of the DC control signal is scaled using the power scaling potentiometer 216 in accordance with an input control signal received from the EEPROM digipot look-up table 218.

The scaled DC control signal from power scaling potentiometer 216 is coupled to a control loop error amplifier 220. The control loop error amplifier preferably increases the magnitude of the DC control signal by some fixed gain value. The amplified DC control signal is thereafter used to control the variable attenuator 208 by means of a conventional control interface.

With the foregoing arrangement, the RF power output from the transmitter can be selectively controlled by the control processor. In general, the control processor can communicate control signals to EEPROM digipot look-up table 218 to specify a desired output power from transmitter 116. The control signals will cause EEPROM digipot look-up table to output a control signal to power scaling potentiometer 216. The control signal can be selected so that it will selectively vary the amount of attenuation applied by variable attenuator 208. Decreasing the amount of attenuation applied to an RF signal by the variable attenuator 208 will increase the input drive to PA 210, thereby increasing the power output from the transmitter 116. Conversely, increasing the amount of attenuation applied to an RF signal by the variable attenuator 208 will decrease the input drive signal to PA 210, thereby decreasing the power output from the transmitter 116. In this way, the RF power output from the transmitter 116 can be selectively controlled.

Those skilled in the art will appreciate that the control loop consisting of directional coupler 214, power scaling potentiometer 216, control loop error amplifier 220, and variable attenuator 208 is merely one possible arrangement for controlling the RF power output of transmitter 116. Other control systems are known in the art and can be used with the present invention. Accordingly, it should be understood that foregoing description is not intended to limit the scope of the invention. In fact, any suitable RF power output control system can be used for this purpose, without limitation.

The maximum power output available from PA 210 is determined by a number of factors, including the designer's choice of RF power transistors, the DC power supply voltage available for supplying power to the RF power transistors, and the bias current setting of the RF power transistors. Typically, the DC power supply voltage and the bias current are selected to achieve a predetermined amount of power output consistent with the transmitter requirements, and the specification and limitations of the RF power transistor devices. Increasing the DC power supply voltage can generally result in increased power output from the RF power transistors in PA 210 for a given exciter signal input level. However, in the case of a battery powered transmitter, due consideration must also be given to the effect of such design parameters on battery longevity.

According to an embodiment of the invention, the DC power supply voltage and/or the bias current setting for the RF power transistors used in PA 210 can be selectively varied to adjust the maximum power output from PA 210. Referring again to FIG. 2, it can be observed that a DC power supply voltage is provided for powering the operation of PA 210. The DC power supply voltage is provided by an adjustable PA power supply 206. Adjustable PA power supply 206 can be any one of a wide variety of conventional power supply circuits capable of providing a DC power supply voltage output that is variable in response to a control signal. Adjustable PA power supply 206 can also include a simple control interface (not shown) by means of which it can be controlled by control processor 120. The output voltage from adjustable PA power supply 206 can be coupled to a conventional battery current limiter circuit 204. Battery current limiter circuit 204 can provide over-current protection for the PA 210 to prevent damage to that circuit in the event of a component failure.

Referring again to FIG. 2, the maximum RF power output from PA 210 can also be varied by modifying a bias current of the RF power transistors used in PA 210. According to an embodiment of the invention shown in FIG. 2, the bias current of one or more RF power transistors comprising PA 210 can be adjusted using EEPROM bias look-up table 201. The EEPROM bias look-up table 201 has a conventional control interface (not shown) by means of which its digital output is controlled by control processor 120. EEPROM bias look-up table 201 can control a bias current of the RF power transistors used in PA 210 by any convenient means.

For example, in an embodiment of the invention shown in FIG. 1, a digital output from EEPROM bias look-up table 201 is used to control an output of D/A converter 202. An output voltage from the D/A converter 202 is communicated to a buffer circuit such as op amp 203. The output of the op amp 203 is coupled to a bias circuit of the RF power transistors to control the bias current setting.

According to an alternative embodiment, an output signal generated by the EEPROM bias look-up table 201 can be used to control a digital potentiometer (not shown) instead of D/A converter 202. An output voltage from the digital potentiometer would be communicated to a buffer circuit such as op amp 203. The output of the op amp would then be used to control the bias current setting for one or more RF power transistors.

Regardless of which of the foregoing embodiments is used, the particular bias current setting can be selectively controlled to optimize a power output of the transmitter 116 based on a user input command. For example, the output of the EEPROM bias look up table 201 can be controlled so as to produce a desired bias setting in response to a user input command that directly or indirectly specifies a frequency, power level, modulation format, data transmission rate, transmitter duty cycle. In this regard, the EEPROM bias look up table 201 is controlled by the control processor 214 to produce a desired bias voltage from the op amp 203.

Nonconstant envelope modulation formats can be biased up with a more linear operating point to optimize distortion and spectral occupancy requirements. A higher bias can be applied as the output power is increased so the higher bias penalty is not incurred at lower power settings. In the case of constant envelope modulation formats, the bias can be minimized to increase the efficiency of the power amplifier.

Figure 3:
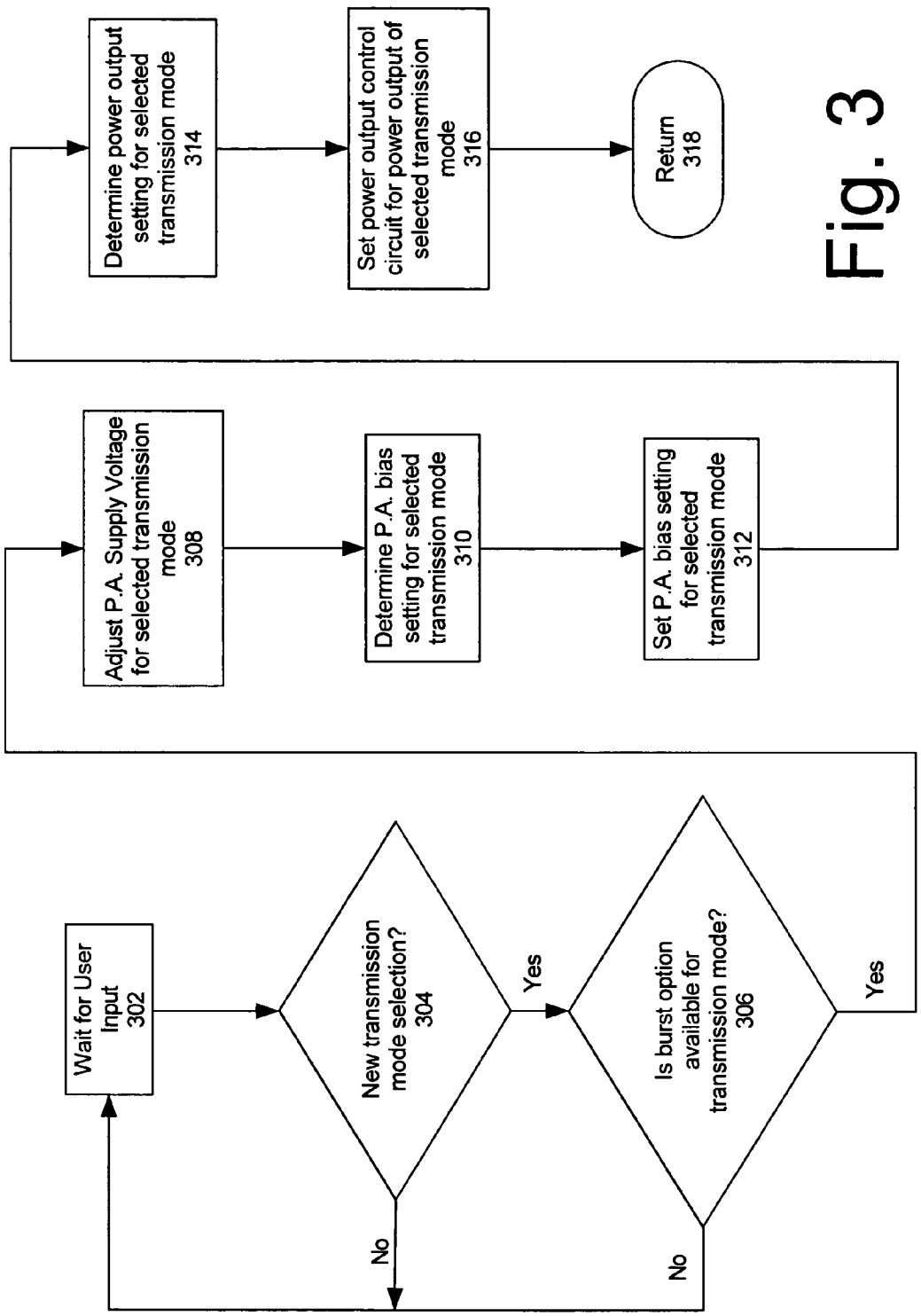
FIG. 3 is flow chart that is useful for understanding a process for increasing a transmitter output power for certain defined transmission modes.

FIG. 3 is flow chart that is useful for understanding a process for increasing an output power of transmitter 116 for certain defined transmission types. The process in FIG. 3 can begin in step 302 when the control processor 120 receives a new user input from the user interface 122. In step 304, the control processor 120 can determine in the user input directly or indirectly indicates that a new transmission mode has been selected.

As used herein, a new transmission mode is any mode in which the transmitter system will transmit signals having a predetermined data rate, modulation type and/or frequency different from that associated with a transmission mode defined with respect to a current state of the transmitter. For example, a transmission mode can be a satellite transmission mode. A satellite transmission mode can be defined by one or more predetermined satellite communications frequencies or frequency bands. A satellite transmission mode can also be defined by a particular modulation type. Further, a satellite transmission mode can be associated with a defined data rate. For example, a defined data rate for a satellite transmission mode can be a burst mode in which one or more data packets is periodically transmitted in a burst. Typically such transmissions can occur at a relatively low transmitter duty cycle since the data is collected and then transmitted intermittently.

According to an embodiment of the invention burst mode is enabled for both FM voice and data modes in the SATCOM TX band of the radio (292-318 MHz). Higher power is useful in this band because of the long distance and path loss to the satellite. Higher power burst mode can also be provided in the low VHF band (30-90 MHz). Such an arrangement would also be useful as small antennas on a handheld are not the efficient at low VHF frequencies. According to an embodiment of the invention, the adjustments to transmitter 116 for implementing higher power output can be implemented for both of these modes. For example, the control processor 120 can automatically make the necessary modifications to the transmitter 116 as described herein in response to a user input command that selects communications that directly or indirectly indicate a user's intention to use the software defined radio 100 to communicate in the SATCOM TX band of the radio. Similarly, the control processor 120 can automatically adjust the settings of transmitter 116 as described herein to provide the higher power output associated with the high power burst mode when communicating on the low VHF band. A user command the directly or indirectly indicates a user intention to communicate on such bands can come in many different forms. For example, such a user command can include a user input command specifying a particular communication frequency, transmission rate, transmitter duty cycle, or modulation type.

Conversely, control processor 120 can automatically modify the settings of transmitter 116 as described herein when user control inputs indicate that low power modes are more appropriate. These include communication applications that need to cover shorter distances with minimal path loss. A handheld on the ground communicating with an aircraft a few miles out would be an example of this.

In step 306, the control processor 120 can determine if a burst option is available for a particular transmission mode which has been selected. The burst option, which includes a higher transmitter power output, can be made available under certain circumstances determined by the designer. Increasing the transmitter power output can stress the transmitter components. Moreover, in the case of a battery powered transmitter, increasing the transmitter power output can more rapidly deplete a battery used to power the transmitter. Accordingly, there are many circumstances where it can be desirable to limit the transmitter power output to some predetermined level. Still, there are some circumstances where the transmitter power output can be increased without substantial negative implications.

For example, in a satellite burst mode, it can be desirable to increase the transmitter power output as compared to ordinary terrestrial communications. The increased power output can be advantageous in a satellite burst mode because it can increase the link margin. Moreover, the higher power output can be practical in a burst mode as compared to other modes of transmission that involve higher duty cycles. That is because the low duty cycle of the burst mode can be less likely to cause overheating or other types of damage to transmitter components. The lower duty cycle of a burst mode of transmission also results in lesser demands on the battery power source for the transmitter.

Referring again to step 306, a designer can choose to define certain burst modes of transmission for which a higher transmitter power output will automatically be provided as compared to other modes. If such a burst mode option is available in step 306, then the process can continue on to step 308. In step 308, a DC power supply output voltage of adjustable PA power supply 206 can be modified. For example the DC power supply voltage supplied to PA 210 can be increased so as to increase the RF power transistors included in the PA 210. In the case of a MOSFET or other type of FET transistor used for the RF power transistor, this will generally increase the value of $V_{DD}$, the voltage applied to the drain of the transistor. For example, the value of $V_{DD}$ can be increased from 9 volts to 12 volts (or to the maximum available battery output voltage). Of course, it should be understood that the invention herein is not limited to use with MOSFET or other types of FET devices. Any type of RF power transistor can be used for this purpose, without limitation.

Referring again to FIG. 3, the process can continue with step 310. In step 310, the control processor can select an optimal bias setting for the transistors in PA 210. As used herein, the term optimal bias setting refers to a bias setting that is modified relative to that used by PA 210 when it is configured for lower power output. The optimal bias setting also refers to a bias setting which permits RF power transistors in PA 210 to produce a desired RF output power for a particular transmission mode that is higher than that available for other transmission modes. The optimal bias setting can also be selected to minimize distortion in the transmitter output at a particular power level. The optimal bias setting for a particular transmission mode is advantageously predetermined by a designer.

The control processor 220 can be programmed to select an optimal bias setting corresponding to a particular transmission mode selected by a user. Once the control processor 120 identifies the optimal bias setting, the process can continue on to step 312. In step 312 the control processor can communicate suitable control signals to set the optimal bias levels for PA 210. For example, this can be accomplished using the EEPROM bias look-up table 201 as previously described in relation to FIG. 2.

Referring again to FIG. 3, the process can continue on to step 314. In step 314, the control processor 120 can determine an RF power output setting for the particular transmission mode selected by the user. Once the appropriate higher power setting is determined in step 314, the process can continue on to step 316. In step 316, the control processor can communicate with an RF power output control loop circuit to set the RF power output at a predetermined level. For example control processor 120 can communicate with EEPROM digipot look-up table 218 to generate a desired RF power output control signal as previously described. With the foregoing arrangement, the RF power output of a conventional handheld transmitter can be selectively increased under certain specified operating conditions. For example, the power output of handheld transmitter can be set 3 dB higher for a satellite burst mode as compared to other transmission modes. In the case of a handheld transceiver device, this could mean a highly desirable increase in transmitter output power to 10 watts for burst mode as compared to 5 watts for other modes of transmission. In step 318, the process will return to step 302 to await the next instruction.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A radio transmitter system, comprising:
an RF power amplifier comprising at least one RF power transistor;
a control processor that generates at least one control signal responsive to a user input; and
at least one circuit configured for selectively varying at least one operating characteristic of said RF power amplifier responsive to said at least one control signal, said operating characteristic selectively varied so as to increase a power output of said radio transmitter system based on at least one user input command;
wherein said control processor is programmed to automatically generate said control signal in response to said at least one user input command that indicates that a second transmission mode has been selected, said second transmission mode being a burst mode in which said radio transmitter system transmits bursts of data at a second duty cycle lower than a first duty cycle associated with a first transmission mode defined with respect to a current state of said radio transmitter system; and
wherein a first RF power output in said first transmission mode comprises substantially a maximum available RF output power of said transmitter in at least said first transmission mode exclusive of potential damage to said transmitter, and a second RF power output in said second transmission mode comprises a power level greater than said first RF power output level, exclusive of damage to said transmitter.

2. The radio transmitter system according to claim 1, wherein said at least one control signal is a bias control signal, and said at least one circuit comprises a bias control circuit configured to control a bias setting for said at least one RF power transistor, said bias control circuit responsive to said bias control signal for varying said bias setting.

3. The radio transmitter system according to claim 1, wherein said at least one control signal is a voltage control signal, and said at least one circuit comprises a variable power supply circuit having at least one variable DC voltage output coupled to said at least one RF power transistor, said variable power supply circuit responsive to said voltage control signal to vary said DC voltage output.

4. The radio transmitter system according to claim 3, wherein RF power transistor is a field effect transistor and said DC voltage output is coupled to a drain of said RF power transistor.

5. The radio transmitter system according to claim 1, wherein said at least one control signal is an RF power output control signal, and said at least one circuit comprises a RF power output control circuit including a feedback loop, said RF power output control circuit responsive to said RF power output control signal for selectively varying an RF power output of said RF power amplifier.

6. The radio transmitter system according to claim 1, wherein said at least one operating characteristic comprises a bias setting for said at least one RF power transistor, a DC power supply voltage applied to said at least one RF power transistor, and a magnitude of at least one control signal.

7. The radio transmitter system according to claim 1, wherein said operating characteristic is selected from the group consisting of a bias setting for said at least one RF power transistor, a DC power supply voltage applied to said at least one RF power transistor, and a magnitude of at least one control signal.

8. The radio transmitter system according to claim 7, further comprising at least one data store containing data specifying a plurality of parameters configured for controlling at least one of said bias setting for said at least one RF power transistor, said DC power supply voltage applied to said at least one RF power transistor, and said magnitude of said control signal.

9. The radio transmitter system according to claim 8, wherein said data store specifies said parameters for at least a first transmitter configuration and a second transmitter configuration.

10. The radio transmitter system according to claim 9, wherein said second transmitter configuration defines a set of operating characteristic for said RF power amplifier that results in a higher maximum RF power output for said RF power amplifier as compared to said first transmitter configuration.

11. The radio transmitter system according to claim 9, wherein said control processor is programmed to automatically configure said radio transmitter system in said second transmitter configuration when said user input command indicates that the radio transmitter system will be transmitting on an operating band including a frequency selected for communicating with an earth orbiting satellite.

12. A method for operating a radio transmitter system, comprising:
    generating a control signal in response to a user input command that indicates that a second transmission mode has been selected, said second transmission mode being a mode in which said radio transmitter system transmits bursts of data at a second duty cycle lower than a first duty cycle associated with a first transmission mode defined with respect to a current state of said radio transmitter system; and
    automatically selectively varying at least one operating characteristic of a power amplifier circuit of said transmitter system responsive to said control signal, said operating characteristic selectively varied so as to increase a power output of said radio transmitter system based on said user input command;
    wherein a first RF power output comprises substantially a maximum available RF output power of said transmitter in at least said first transmission mode exclusive of potential damage to said transmitter, and a second RF power output of said transmitter in said second transmission mode comprises a power level greater than said first RF power output level, exclusive of damage to said transmitter.

13. The method according to claim 12, further comprising selecting said at least one operating characteristic to include a bias setting for at least one RF power transistor of said radio transmitter system.

14. The method according to claim 12, further comprising selecting said at least one operating characteristic to include a DC power supply voltage coupled to at least one RF power transistor of said radio transmitter system.

15. The method according to claim 14, further comprising selecting said at least one RF power transistor to include a field effect transistor and coupling said DC power supply voltage to a drain of said RF power transistor.

16. The method according to claim 12, further comprising selecting said at least one operating characteristic to include an RF power output of said radio transmitter system.

17. The method according to claim 12, further comprising selecting said at least one operating characteristic to include a bias setting for said at least one RF power transistor, a DC power supply voltage applied to said at least one RF power transistor, and an RF power output of said radio transmitter system.

18. The method according to claim 12, further comprising selecting said at least one operating characteristic to include at least one of a bias setting for said at least one RF power transistor, a DC power supply voltage applied to said at least one RF power transistor, and an RF power output of said radio transmitter system.

19. The method according to claim 18, further comprising storing in at least one data store a plurality of parameters for controlling said bias setting for said at least one RF power transistor, said DC power supply voltage applied to said at least one RF power transistor, and said RF power output of said radio transmitter system.

20. The method according to claim 19, further comprising selecting said parameters to include at least a first transmitter configuration and a second transmitter configuration.

21. The method according to claim 20, further comprising selecting said second transmitter configuration to include a set of operating characteristic for said RF power amplifier that results in a higher maximum RF power output for said RF power amplifier as compared to said first transmitter configuration.

22. The method according to claim 21, further comprising automatically configuring said radio transmitter system in said second transmitter configuration when said user input command indicates that the radio transmitter system will be transmitting on an operating band including a frequency selected for communicating with an earth orbiting satellite.

23. A method for obtaining maximum output power from a transmitter, comprising:
    operating a radio transmitter at a first RF output power level in a first transmission mode, said first RF output power level comprising substantially a maximum available RF output power of said transmitter in at least said first transmission mode exclusive of potential damage to said transmitter;
    responsive to a user command, operating said radio transmitter in a second transmission mode different from said first mode;
    automatically increasing an RF output power of said transmitter to a second RF output power level greater than said first RF output power level, exclusive of damage to said transmitter, when said second transmission mode is selected;
    wherein said second transmission mode comprises a burst mode in which said radio transmitter system exclusively transmits packet data in bursts at a second duty cycle lower than a first duty cycle associated with a first transmission mode.

24. The method according to claim 23, further comprising automatically enabling said burst mode for FM voice and data communications when said second transmission mode is used for communications with an earth orbiting satellite.

25. A communication system in which maximum output power is obtained from a transmitter in a plurality of operating modes, comprising:
    a radio transmitter configured to operate at a first RF output power level in a first transmission mode, said first RF output power level comprising substantially a maximum available RF output power of said transmitter in at least said first transmission mode exclusive of potential damage to said transmitter;
    processing means responsive to a user command, configured for causing said radio transmitter to operate in a second transmission mode different from said first mode, said processing means configured for automatically increasing an RF output power of said transmitter to a second RF output power level greater than said first RF output power level when said second transmission mode is selected, without causing damage to said transmitter;
    wherein said second transmission mode is a burst mode in which said radio transmitter system exclusively transmits packet data in bursts at a second duty cycle lower than a first duty cycle associated with a first transmission mode.

* * * * *